United States Patent
Malavazos

[11] 3,815,199
[45] June 11, 1974

[54] MANUFACTURE OF FLUIDIC ELEMENTS

[76] Inventor: Arthur Malavazos, 28504 Mission Blvd., No. 942, Hayward, Calif. 94545

[22] Filed: Jan. 19, 1973

[21] Appl. No.: 325,191

[52] U.S. Cl. ................... 29/157 R, 137/833, 29/416
[51] Int. Cl. ................................................ F15c 5/00
[58] Field of Search ............ 29/157 R, 416; 137/833

[56]          References Cited
          UNITED STATES PATENTS
3,334,401   8/1967   Hopkinson, Jr. .................. 29/157 R
     FOREIGN PATENTS OR APPLICATIONS
1,130,973   10/1968   Great Britain ...................... 137/833

*Primary Examiner*—Charles W. Lanham
*Assistant Examiner*—D. C. Crane
*Attorney, Agent, or Firm*—Robyn Wilcox

[57]          ABSTRACT

Fluidic elements are formed of pie-shaped segments in which the major ducts are formed in the edge of the pie-shaped segments. The ducts can be formed by milling, coining, stamping or molding, since their depth is normally one-fourth that of their width. The respective segments are assembled into a circular plate and inserted in a suitable containing structure.

5 Claims, 6 Drawing Figures

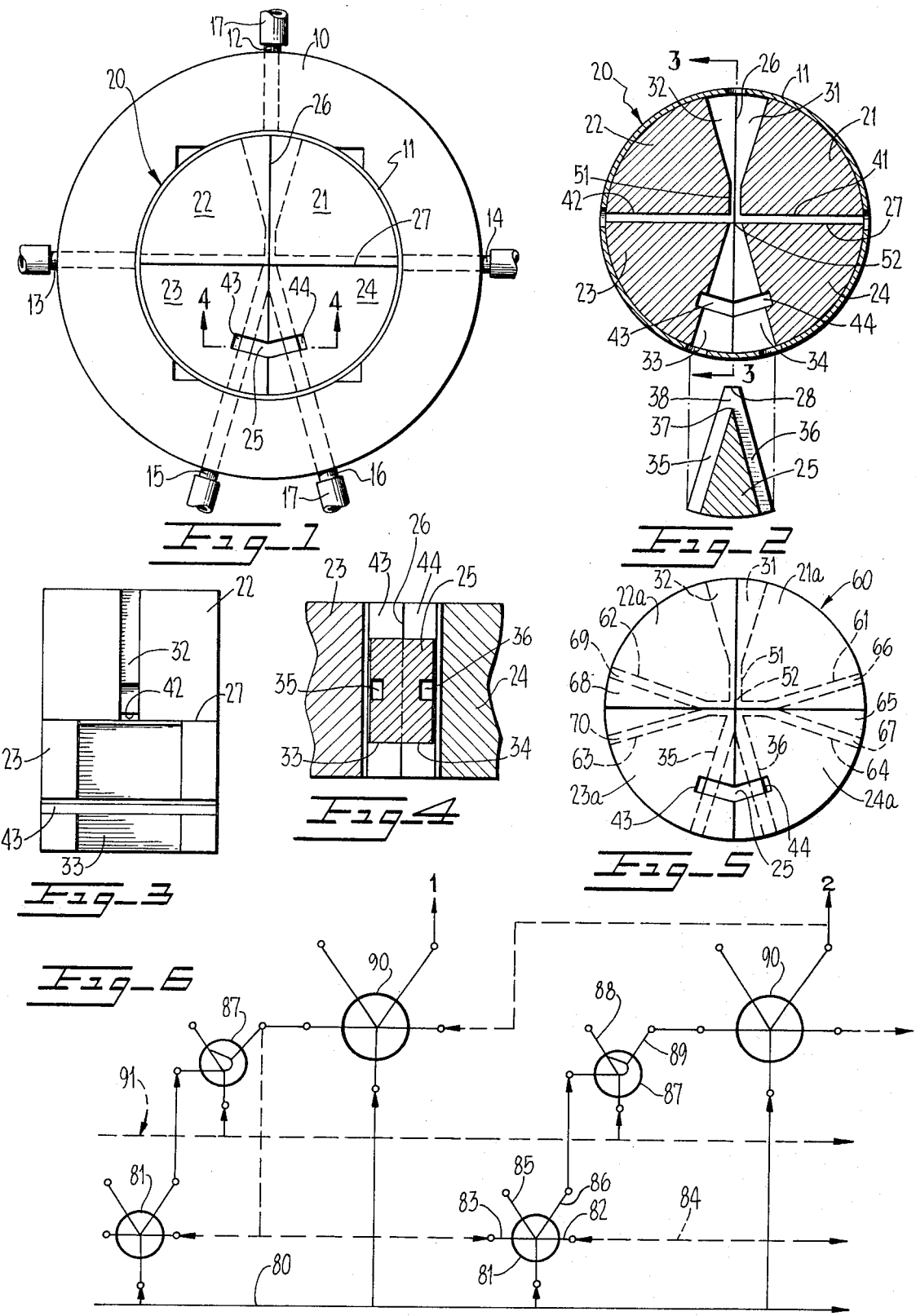

MANUFACTURE OF FLUIDIC ELEMENTS

BACKGROUND OF THE INVENTION

Within the past few years there has been a tremendous interest in, and development of, fluidic components which correspond in function to the various electronic components. When compared to the speed of electronic equipment, fluidic devices (such as computers, control devices, measuring devices, etc.,) are much slower but they are still much faster than the mechanical equipment whose operation they control. It will be realized that fluidic elements operate at speeds up to approximately 0.001 of a second, which is faster than a machine tool can be adjusted and is fast enough for some computer equipment. While slower than electronic devices of comparable nature, the fluidic devices have certain advantages in that they cannot cause electrical shorts, or sparks, and therefore can be used in explosive conditions, in space craft, and other places where a spark would be extremely dangerous; fluidic devices are not affected by radiation or magnetic currents or the stray impulses that are often found around electric equipment; and, there is no heating problem in fluidic devices, as the only operating element is the current of air.

In the present art, fluidic devices are generally formed in laminated structures. A relatively thick substrate is used as a base and the various ducts, or channels, are formed therein by molding, milling, or the like, and a relatively thin cover is then cemented onto the substrate. The art is full of comments about the requirements for absolute accuracy in the formation of these channels, the channels must have walls with angles exactly 90° with top and bottom; they must be perfectly straight, because any deformation creates turbulence that affects operation of the device; and it may be true that the cementing of the cover plate to the substrate may result in small bubbles of the cement being pushed into the channels which create a turbulence therein. In contrast to this, in the present invention the fluidic element, instead of being formed on a circular substrate, is formed in small "pie-shaped" segments by any suitable means. I have found that the channels formed by milling, by coining, or stamping, or by molding the elements out of plastic, are all suitable for my purpose. These elements are not cemented together, or at least if properly made, do not need to be, but can be held firmly together by some suitable retaining ring.

The devices of the present invention can be smaller than has heretofore been the practice. In this respect I have made fluidic elements with a diameter of 1/4 inch and a thickness of 1/8 inch, which are inserted in a suitable retaining ring of any practical size. It will, of course, be assumed that the retaining ring has apertures which will be aligned with the ducts in the fluidic element and will be provided with connections to ducts, normally plastic tubing, which conduct the current of air to and from the element. Since one of the difficulties of the elements of the present art is the forming of channels in the substrate, they must be of larger size so that an array of such elements as, for example, in a computer controlling a piece of machinery, becomes quite large and space becomes an important factor. Since the elements of the present invention can be approximately one-fourth the size of those commonly used at present, it is obvious that the computer array can be much smaller, which results not only in a saving of space, but also in a saving in the air supply needed to operate the same.

I have also found that if the channels, and particularly the supply channel and the splitter, are mirror images of each other, turbulence does not become a factor. Thus, if the two components that form a channel, for example, the supply channel, are formed from the same die, any deviation from perfect accuracy in one segment will be matched by the identical defect in the other, whereby one cancels out the other. I have also found that if the ducts are to be formed by injection molding, the mold can be slightly tapered at each side (it being remembered that the depth of the conduit which normally is rectangular, is approximately one-fourth of the width of the duct, so that the depth of the conduit in each segment needs to be only one-eighth of the width of the conduit). In this situation, both ducts have the same taper, being slightly larger in the center line than at the extreme side walls, so that the die is readily removed from the plastic. In the prior art, when a die which had to be four times as long as its width was used to form plastic fluidic elements, the withdrawal of the die from the element pulled the channel out of its perfect accuracy and thereby caused defective operation of the element. My investigation in this field leads me to suspect that it may even be possible to make the conduits in each segment semi-circular so that a round conduit is formed when the two are clamped together.

OBJECTS

It is the primary object of the present invention to improve fluidic elements.

It is another object of the present invention to fabricate smaller elements than have heretofore been found to be satisfactory.

It is another object of the present invention to provide fluidic elements which are more easily manufactured and which operate more satisfactorily.

It is another object of the present invention to provide fluidic elements which are smaller than heretofore practical, are cheaper and easier to manufacture, and which are more accurate and dependable in their performance.

These and other objects of the present invention will be apparent from the following disclosure taken in conjunction with the drawing attached hereto in which:

FIG. 1 is a plan view of the assembled fluidic element of the present invention inserted in a suitable retaining structure.

FIG. 2 is a cross-sectional plan view of the fluidic element shown in FIG. 1 with the splitter structure moved from its position in the element.

FIG. 3 is a vertical cross-sectional view of the fluidic device shown in FIGS. 1 and 2, such as taken along the plane indicated by the line 3—3 of FIG. 2.

FIG. 4 is a transverse cross-sectional view taken through the fluidic device of the previous FIGS., taken along a plane below, or downstream from, the splitter point, such as along the line 4—4 of FIG. 1.

FIG. 5 shows a fluidic device similar to that shown in the previous structures in which there are two control conduits on each side of the inlet so that the operation of the device can be controlled by four separate control pulses.

FIG. 6 is a diagrammatic view of an array of fluidic devices using "AND" and "NOR" gates.

SPECIFICATION

The fluidic element 20 is preferably set in a holder 10 which may be formed of plastic, or other suitable material, and its components are held in tight adjacency by a retaining ring 11, preferably of metal. Both the holder 10 and retaining ring 11 are provided with apertures aligned with the apertures of the fluidic element 20, such as the inlet 12, control ducts 13 and 14, and outlets 15 and 16. These correspond to the ducts of the fluidic element 20 to be described in the next and succeeding paragraphs. These apertures may be formed by any suitable means, but preferably are provided with metallic nipples to which small hoses 17 can be attached. For purposes of illustration, the fluidic element 20 is shown in FIG. 2 as comprising four sections 21, 22, 23 and 24, and a splitter element 25. The four elements, or quadrants, tightly abut each other along faces 26 and 27, as shown.

The first two elements 21 and 22 are provided with inlet channels 31 and 32, respectively, formed in an intermediate portion of their common wall. As shown in FIG. 2, these two channels abut and are mirror images of each other; and, as shown in FIGS. 2 and 3, are located at the intermediate elevation of each respective section, so that the inlet channel 31, 32 is confined within integral top and bottom walls formed in the respective sections 21, 22. Preferably, the two channels 31, 32 are flared outwardly at the circumference to more readily position the fluidic element 20 in its holder 10 without being subjected to the requirement of very accurate positioning. It is important that the two ducts 31, 32 be mirror images of each other. They may be formed by any suitable means, such as milling, stamping or coining, or if the fluidic element 20 is made of plastic, they preferably would be molded into the respective elements. As has been indicated above, the side walls forming the inlet 31, 32 do not have to be at exact 90° angles with top and bottom, but can be tapered slightly so that the forming die can be readily removed without distorting the conduit walls.

In the form of fluidic element shown, which is one of the most simple and is commonly referred to as the "little man," control ducts 41 and 42 are formed in the respective elements or quadrants 21 and 22, respectively, along face 27 with sections 24 and 23, respectively. As mentioned with conduit 31, 32, these two ducts can be formed by stamping, milling, molding, or other suitable means; and are located at a mid-point in the thickness of the two segments 21, 22.

Elements, or quadrants 23 and 24 are provided with much deeper slots 33 and 34, respectively, adapted to retain the splitter element 25, shown in FIG. 2. It is well-known in the art that the splitter point must be at an angle of approximately 30° -- it can be slightly smaller or slightly larger but must be in a range of 30°. While the quadrants 23 and 24 are right angular at the center and the edges thereof, the respective conduits 33 and 34 are formed at angles of approximately 15° each from the abutting edges 26, or of about 75° from the abutting edges 27 and the splitter element 25 which fits in these two mirror image conduits is preferably formed with an angle about 30°. The two elements 23 and 24 are respectively provided with transverse notches 43 and 44, respectively, which extend completely through the thickness of these two elements. These slots are adapted to provide breather holes which communicate with the two outlet ports 15 and 16 which are formed when the splitter element 25 is inserted in the channel formed by abutting ducts 33, 34.

The splitter element 25 subtends an angle of 30° and the tip is slightly truncated as at 28 so that it may solidly abut the diametrical interface 27 of the elements 21 and 22, respectively. Centrally located on the two angular faces thereof are ducts 35 and 36. The angular sidewalls of the splitter 25 tightly abut against the sidewalls of the conduits 33 and 34 formed in the elements 23 and 24, respectively. The ducts 35 and 36 are located centrally of the thickness of the element 25 so that each communicates with the inlet duct 31, 32 and are separated at a sharp splitter point 37, which has an angle of about 30°. When the splitter element 25 is inserted within the cavity formed by the conduits 33, 34 of elements 23 and 24, respectively, the sidewalls of the element tightly engage the sidewalls of the ducts 33 and 34 and its own ducts 35 and 36 are in communication with the inlet duct 31, 32. The two ducts 35 and 36 in the splitter element 25 also communicate with the breathing ducts 43 and 44. Strange as it may seem, it is well-known in the fluidic art that these breather ducts are essential to the operation of the fluidic element but do not adversely affect the flow of air through conduits 35 or 36, as the case may be.

It is seen by reference to FIGS. 1 and 2 that air entering through the funnel-shaped duct 31, 32 discharges at the junction of the four segments through inlet port 51, discharging into a central area 52 located at the confluence of the inlet duct 51 with the control ports 41 and 42. The central area 52 communicates with the entrance section 38 in the splitter segment 25 just ahead of the splitting edge 37. As is well understood in the art, the air passing through the inlet duct 51 will go through channel 35 or 36, depending upon a pulse or jet of air through the control conduits 41 or 42. As is well-known in the fluidic art, the well-known Coanda, or wall hugging, effect is operative to continue the flow through the conduit established, which flow will continue until a pulse from the other control conduit changes the flow into the other one.

The embodiment shown in FIG. 5 illustrates a fluidic element 60 which has two controls for each side outlet channel 35 or 36. Thus, the flow can be established through outlet channel 35 or 36 by the pulses from two different sources for each respective channel. In such a situation, the auxiliary control channels could be drilled to communicate with the channels 41 and 42 a point removed from the central section 52, as is well-known in the art. However, for purposes of illustration, I have formed these two control channels on each side in the same manner as the splitter segment 25. Thus, quadrant elements 21-a and 24-a are formed with a recess 61 and 64, respectively, and a pie-shaped segment 65 is inserted therein to provide control channels 66 and 67, respectively. Similarly, segments 22-a and 23-a are recessed as at 62 and 63, respectively, and a segment 68, similar in shape to the splitter element, is inserted therein to form the control conduits 69 and 70. Thus, the control through the inlet throat 51 can be shifted in one direction by pulse either through control conduit 66 or control conduit 67 or through the other channel by a pulse through either control conduit 69 or 70.

FIG. 6 illustrates a partial array used for control of some device and is used to illustrate the application of the devices made by the present invention. The air is applied through a supply line 80 to a plurality of AND-gates 81 in parallel and pulses to each may be controlled through control lines 82 and 83 provided from some source of supply 84. In the array shown, one outlet line 85 discharges to atmosphere and the other line 86 leads to a second stage NOR-gate 87. The NOR-gates, in turn, are supplied by pressurized air line 91 to channel the flow of air through line 86 to outlet 88 to atmosphere or to outlet line 89 leading to a second stage AND-gate 90, etc. This figure is illustrative only of the fact that the various arrays of the various fluidic gates, such as "OR," "AND," "NOR," "NOT," "NAND," and the like, can be established to count, act as a computer, or as a control for various devices, or the like.

While only the simple "little man" fluidic device has been used to exemplify the present invention, it is believed obvious that the same procedure in manufacturing the various fluidic elements, such as the OR, AND, NOR, NOT, NAND gates and the like, can be made by the same process, although many of these old devices become quite complicated in form. However, the basic elements of each is the same and the various fluidic elements can be manufactured more easily, less expensively, and with greater accuracy than the present use of trying to form the channels from the top of a thick substrate and then covering them with a suitable cover.

I claim:

1. The method of constructing a fluidic device having an inlet duct, outlet ducts and control ducts which comprises the process of:
   a. dividing a proposed device into a plurality of pie-shaped segments bounded by the said ducts of said device and adapted to be bound together to form the complete element;
   b. forming ducts in an intermediate portion of an edge along the respective segments;
   c. separating the outlet ducts of the element by a splitting segment having ducts formed in the sides thereof and having a splitting edge of approximately 30° facing inwardly thereof; and
   d. assembling the plurality of segments together.

2. The method of claim 1 wherein the inlet duct is formed one-half in the edge of one of said segments and one-half is formed in the adjoining edge of the adjoining segment.

3. The method of claim 1 wherein the proposed device is divided into four equal segments, the inlet duct is formed equally in the adjoining edges of two of said segments, a control duct is formed in the other edges of said two segments, and the outlet ducts are equally positioned in the remaining two segments.

4. The method of claim 3 wherein the outlet ducts are formed by forming a duct in each of the remaining two segments, which ducts each form an angle of approximately 15°; and inserting a splitting segment forming an angle of the total value of said two ducts, and forming a duct in each interior wall of said segment.

5. The method of constructing fluidic elements which comprise the process of:
   a. dividing a proposed device into a plurality of pie-shaped segments adapted to be bound together to form the complete element,
   b. forming an inlet channel in an intermediate portion of an edge along the wall that separates two of said segments,
   c. forming outlet channels in the intermediate portion of the edge along the wall that separates two other of said segments, said outlet channels diverging from the center of said device at an angle of about 15° in each segment,
   d. inserting a tight fitting splitter segment into the cavity formed by the two said outlet channels, and
   e. forming outlet ducts in the intermediate portion of the edge of a wall that separates the splitter segment from each of the two other of said segments.

* * * * *